(12) United States Patent
Stengele et al.

(10) Patent No.: US 7,272,881 B2
(45) Date of Patent: Sep. 25, 2007

(54) PRODUCTION INSTALLATION

(75) Inventors: Gerald Stengele, Ludwigsburg (DE); Jörg-Michael Nussbaum, Ludwigsburg (DE); Ioan-Mircea Corbean, Marbach (DE)

(73) Assignee: Cross Huller GmbH (DE)

( * ) Notice: Subject to any disclaimer, the term of this patent is extended or adjusted under 35 U.S.C. 154(b) by 0 days.

(21) Appl. No.: 11/402,409

(22) Filed: Apr. 12, 2006

(65) Prior Publication Data

US 2006/0230596 A1  Oct. 19, 2006

(30) Foreign Application Priority Data

Apr. 13, 2005  (EP)  ............... 05 008 034

(51) Int. Cl.
  *B23P 23/00*  (2006.01)
(52) U.S. Cl. .................. 29/563; 29/33 P; 198/377.07; 414/222.01
(58) Field of Classification Search .............. 29/563, 29/33 P, 564, 711, 791; 198/377.01, 377.07, 198/379, 347.1, 347.4, 348, 346.1, 346.2, 198/346.3, 345.1, 345.2, 345.3; 414/222.01, 414/222.04, 226.01, 226.02, 225.01; 901/6, 901/30, 31
  See application file for complete search history.

(56) References Cited

U.S. PATENT DOCUMENTS

| | | | | |
|---|---|---|---|---|
| 4,097,984 A | * | 7/1978 | Petrov | .................. 29/563 |
| 4,316,398 A | * | 2/1982 | Link et al. | ................... 82/125 |
| 4,722,653 A | * | 2/1988 | Williams et al. | .............. 29/563 |
| 4,809,425 A | * | 3/1989 | Monforte | ..................... 29/563 |
| 5,056,964 A | * | 10/1991 | Naka et al. | .................... 29/563 |
| 5,281,194 A | * | 1/1994 | Schneider | .................... 483/14 |
| 5,632,588 A | * | 5/1997 | Crorey et al. | ............ 198/468.2 |
| 6,138,818 A | * | 10/2000 | Green | ......................... 29/563 |
| 6,581,750 B1 | * | 6/2003 | Tweedy et al. | ......... 198/377.07 |
| 6,619,641 B2 | | 9/2003 | Heitzmann et al. | |
| 6,641,128 B2 | | 11/2003 | Fries | |
| 6,826,821 B2 | * | 12/2004 | Geiger et al. | ................. 29/563 |
| 2004/0020746 A1 | * | 2/2004 | Tweedy et al. | ......... 198/377.01 |

FOREIGN PATENT DOCUMENTS

| | | |
|---|---|---|
| DE | 19756278 A1 | 7/1999 |
| DE | 199 20 291 A1 | 11/2000 |
| EP | 1 084 794 A1 | 3/2001 |
| EP | 1 260 304 B1 | 11/2002 |
| WO | WO 02/00388 A1 | 1/2002 |

* cited by examiner

*Primary Examiner*—Dana Ross
(74) *Attorney, Agent, or Firm*—Reising, Ethington, Barnes, Kisslle, P.C.

(57) ABSTRACT

A production installation comprises a loading transport means with a transport rail connecting processing machines. It also comprises workpiece grippers for supplying the processing machines with workpieces to be processed and for removing processed workpieces from the processing machines. The workpiece grippers can be pivoted about only one pivot axis between a lowered transfer position and a pivoted-up transport position. The processing machines also comprise a workpiece carriage which can be displaced transversely with respect to the direction of the transport rail for transport between the workpiece gripper and processing position on the processing machine.

20 Claims, 6 Drawing Sheets

PRODUCTION INSTALLATION

BACKGROUND OF THE INVENTION

1. Field of the Invention

The invention concerns a production installation
with several processing machines which are disposed next to each other in a row;
with a loading transport means which comprises
  a transport rail connecting the processing machines,
  at least one loading means which is movable on the transport rail; and
  at least one workpiece gripper disposed on the loading means for supplying the processing machines with workpieces to be processed and for removing processed workpieces from the processing machines;
with a supply transport means for supplying workpieces to be processed to the loading transport means in a transport direction, transverse to the direction of the transport rail; and
with a discharge transport means for unloading processed workpieces from the loading transport means in a transport direction transverse to the direction of the transport rail.

2. Background Art

Production installations of this type are widely used and are disclosed e.g. in EP 1 084 794 A1 or WO 02/00388 A1 or DE 197 56 278 A. They are also referred to as production lines and comprise several processing machines which are disposed next to each other to or from which workpieces are supplied or removed using a loading transport means and a transfer means serving as a loading means. These conventional production installations are of very complex construction.

SUMMARY OF THE INVENTION

It is therefore the underlying purpose of the invention to simplify the construction of a production installation of this type.

This object is achieved in accordance with the invention by at least one workpiece gripper being pivotable about only one pivot axis between a lowered transfer position and a pivoted-up transport position. The workpiece gripper is pivoted about only one single axis and its structure and kinematics are very simple. It is loaded or unloaded, i.e. receives a workpiece to be processed that is transferred to a processing machine, in an at least substantially horizontal orientation. In the same manner, a processed workpiece is removed from the processing machine and transported away. To prevent collisions, the workpiece gripper is pivoted upwardly during transport.

The further development, according to which the at least one workpiece gripper is fork-shaped, particularly facilitates reception of a workpiece carrier in the workpiece gripper and removal thereof.

In the further development, according to which the workpiece carriers are provided for the workpieces and comprise lateral retaining elements, and according to which the at least one fork-shaped workpiece gripper comprises two arms having grooves for receiving the retaining elements, the workpiece gripper may be designed as a so-called passive workpiece gripper, which need not actually exert a gripping motion. In principle, the inventive installation can also be used with stationary workpiece tables and processing machines can also be used with which the tool spindle moves in the z-direction. In the design described above, the workpiece gripper is a so-called passive gripper with the particularly advantageous further development, according to which the processing machines comprise a workpiece carriage which is movable transversely with respect to the direction of the transport rail. The workpiece is transported from the pivoted-down workpiece gripper to the processing location in the processing machine and back using the workpiece carriage. No special procedures are required.

In the further development, according to which two workpiece grippers are disposed on the loading means, a workpiece gripper can be used for transporting workpieces to be processed and the other workpiece gripper can be used for transporting processed workpieces. This reduces the downtimes, i.e. the inoperative times of the processing machines.

The design of the supply transport means, the discharge transport means, the storage transport means, the transfer transport means, and the cooperating loading means supplies the workpieces to be processed, repositions these workpieces and discharges the processed workpieces in a very simple and flexible manner. The described transport means may be of very simple design. Both parallel and sequential processing are possible, i.e. the same processing procedures can be simultaneously performed on different workpieces at several processing machines or different processing procedures can be sequentially performed at the processing machines on the same workpiece.

The further development, according to which the processing machines are disposed on one side of the transport rail in only one row, and the storage transport means is disposed on this one side next to the supply transport means, is particularly advantageous, since it utilizes the transport motion of the different transport means and the displaceability of the tool carriage of the respective processing machine to transfer or remove the workpiece to or from the workpiece gripper.

Further features, advantages and details of the invention can be extracted from the following description of an embodiment with reference to the drawing.

DESCRIPTION OF THE PREFERRED EMBODIMENT

Figure 1:
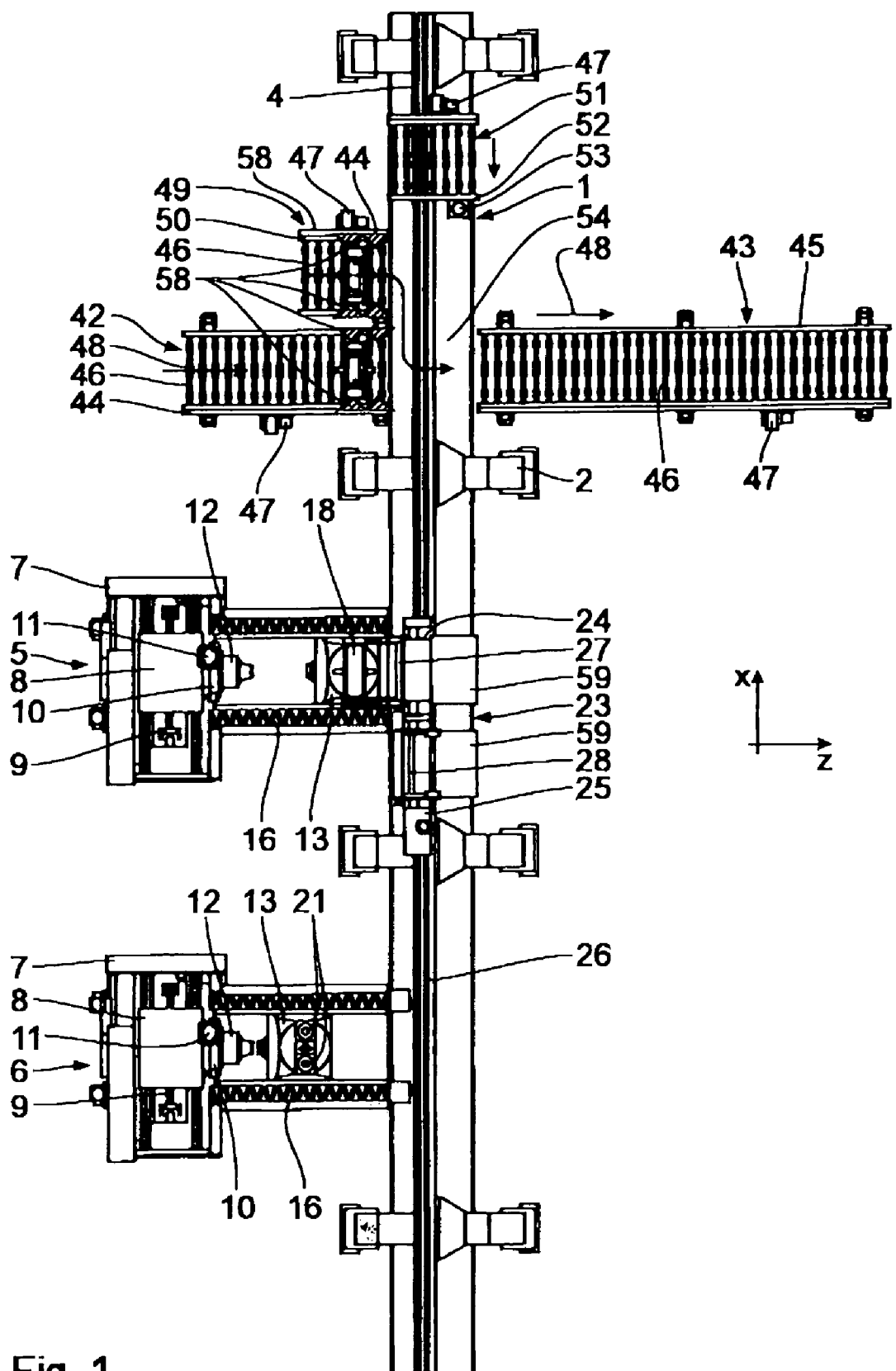
FIG. 1 shows a top view of a production installation according to the invention.

The production installation shown in the drawing comprises a loading transport means 1 having a transport rail 4 which is supported on the floor 3 via supports 2.

Processing machines 5, 6, in the present case machine tools, are disposed on one side (left hand side of FIG. 1) of the loading transport means 1. They comprise a machine frame 7 on which an x carriage 8 is disposed which can be displaced horizontally, parallel to the longitudinal direction of the transport rail 4, using a ball roll spindle drive 9. A carriage 10 is disposed on the side of the x carriage 8 facing the loading transport means 1 and can be vertically displaced by a ball roll spindle drive 11. A tool spindle 12 is disposed on the y carriage 10, which cannot be displaced in the z direction (i.e. horizontal, transverse to the x direction and perpendicular to the longitudinal direction of the transport rail 4). A workpiece carriage 13 is disposed on the machine frame 7 such that it can be displaced in the z direction and is driven in the z direction by a ball roll spindle drive 14. A workpiece table 15 is disposed on the workpiece carriage 13 and can be pivoted about a vertical B axis (parallel to the y direction) and about a horizontal A axis (parallel to the transport rail 4 and extending in the x direction). Shaving conveyors 16 are disposed on the side of the machine frame 7 below the tool carriage 13 and are designed as spiral conveyors to transport the shavings to a central shavings conveying means 17, disposed below the transport rail 4.

Workpieces 18 to be processed are clamped on the respective workpiece table 15. Towards this end, workpiece carriers designed as adapter plates 19 are provided, each having a workpiece receptacle 20. The respective workpiece 18 is precisely mounted to these adapter plates 19. Such adapter plates 19 are known in the art e.g. from EP 1 260 304 B1 (corresponds to U.S. Pat. No. 6,619,641 B2).

The adapter plates 19 are clamped on the workpiece table 15 of the workpiece carriage 13 using so-called zero point clamping means 21 which are structured like a tool clamping means to each fix an undercut clamping bolt 22, mounted to the lower side of the adapter plate 19, by pulling it in a downward direction. Such zero point clamping means 21 are conventional and are disclosed e.g. in U.S. Pat. No. 6,641,128 B2 and DE 199 20 291 A1.

The loading transport means 1 supply the workpieces 18 to be processed and remove the processed workpieces 18 to and from the processing machines 5, 6. Towards this end, a loading means 23 is displaceably mounted to the transport rail 4. It comprises a travelling carriage 24 which surrounds the transport rail 4 in an approximately C-shape and is supported on the upper and lower sides thereof. A travelling drive motor 25 is disposed on the travelling carriage 24. The transmission from the motor 25 to the rail 4 is effected by a toothed rack 26 mounted on the transport rail 4. Two adjacent workpiece grippers 27, 28 are disposed in bearing blocks 29 on the travelling carriage 24 in the longitudinal direction of the transport rail 4, and can pivot about pivot axes 30 extending parallel to the transport rail 4. Each workpiece gripper 27 and 28 has a piston cylinder pivot drive 31, 32 which can be hydraulically operated for independent pivoting thereof. Their respective cylinders 33 are each hinged on the side of the travelling carriage 24 facing the processing machines 14, 15. The piston rod 34 projects from the top of the cylinder 33 and is hinged to the workpiece gripper 27 or 28. In the retracted state of the piston rod 34, the respective gripper 27 or 28 is in a lowered, substantially horizontal position facing the processing machine 5 or 6. When the piston rod 34 extends out of the cylinder 33, the workpiece gripper 27 or 28 is in an elevated position which is pivoted through 120°, beyond vertical, relative to the pivoted-down position. The drawing shows the workpiece gripper 27 in the pivoted-down transfer and removal positions and the workpiece gripper 28 in the pivoted-up, transport position.

The workpiece grippers 27, 28 are all fork-shaped and open towards the respective processing machine 5, 6 in the pivoted-down position. They comprise two parallel arms 35, 36 having one groove 38 on each of their facing, inner sides 37, which is open towards the free end of the respective arm 35 and 36.

Positioning pins 40 are mounted to opposing longitudinal sides 39 of the adapter plate 19 and are matched to the respective groove 38. When an adapter plate 19 is received in a workpiece gripper 27 or 28, the positioning pins 40 occupy the grooves 38. When the respective gripper 28, 28 is pivoted up, the carrier 19 slides into the gripper 27, 28 until a positioning pin 40 abuts the end of the groove 38, serving as a stop 41.

The workpieces 18 to be processed are supplied to the loading transport means 1 using a supply transport means 42 and the processed workpieces 18 are removed from the loading transport means 1 using a discharge transport means 43. The two transport means 42, 43 are designed as roller conveyors, i.e. they have a large number of transport rollers 46 disposed one after the other on a frame 44, 45 which is supported relative to the floor 3, each being driven by a motor 47 in the same transport direction 48.

A storage transport means 49 is disposed next to the loading transport means 1 on the side of the supply transport means 42 facing away from the next processing machine 5 and having the same design as the transport means 42, 43, i.e. comprising a frame 50 supported on the floor 3 and transport rollers 46 driven by a motor 47.

This storage transport means 49 is stationary. The lateral separation between the storage transport means 49 and the supply transport means 42 corresponds to the lateral separation between the workpiece grippers 27, 28 in the direction of the transport rail 4. A transfer transport means 51 is moreover provided comprising a frame-like rack 52 in which transport rollers 46 are rotatably disposed and driven by a motor 47. All transport rollers 46 are parallel to each other and in horizontal orientation. The transfer transport means 51 is not supported on the floor 3, rather is displaceably disposed on the transport rail 4 like the travelling carriage 24, wherein the drive is realized by a conveying motor 53. The transfer transport means 51 can be displaced between three positions, i.e. a first rest position (FIG. 1), a second storage position in front of the storage transport means 49, and a third discharge position in front of the discharge transport means 43, i.e. in the gap 54 between the transport means 42, 43.

As is shown in FIG. 1, the transport rollers 46 comprise central guiding rollers 55 which centrally guide the adapter plates 19 on the different transport means 42, 43, 49, 51. Towards this end, the adapter plates 19 comprise central guiding rails 56 cooperating with the central guiding rollers 55 and extending over several transport rollers 46. These guiding rails 56 also ensure that an adapter plate 19 is not jammed or wedged between neighboring transport rollers 46. The adapter plates 9 also comprise lateral guiding rails 56 for laterally guiding them on the transport rollers 46. The supply transport means 42 and the storage transport means 49 finally comprise stoppers 58 on their sides facing the transport rail 4, which serve for braking or retaining an adapter plate 19.

Figure 2:
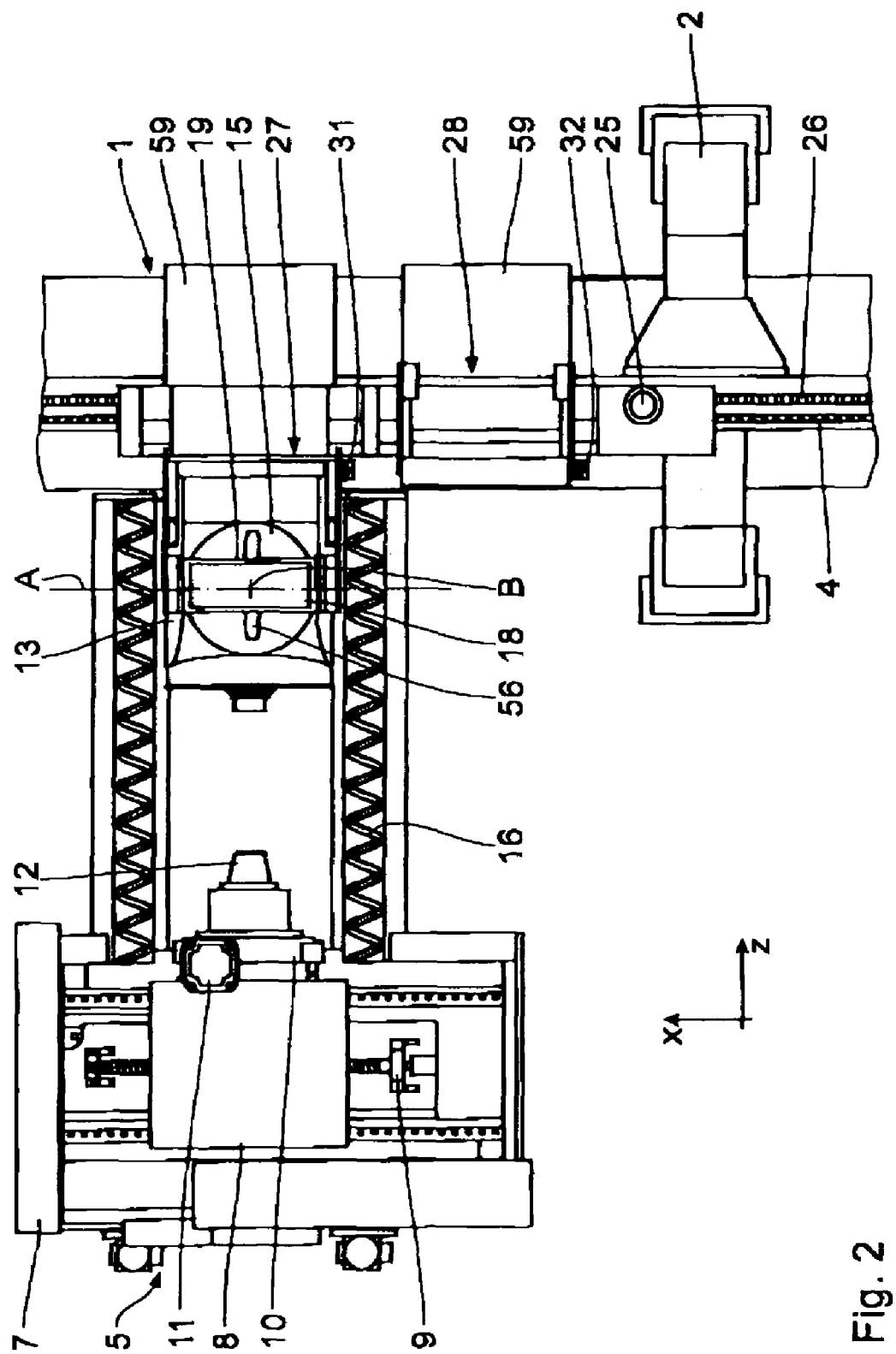
FIG. 2 shows a top view detail of the production installation, in an enlarged view compared to FIG. 1.
Figure 3:
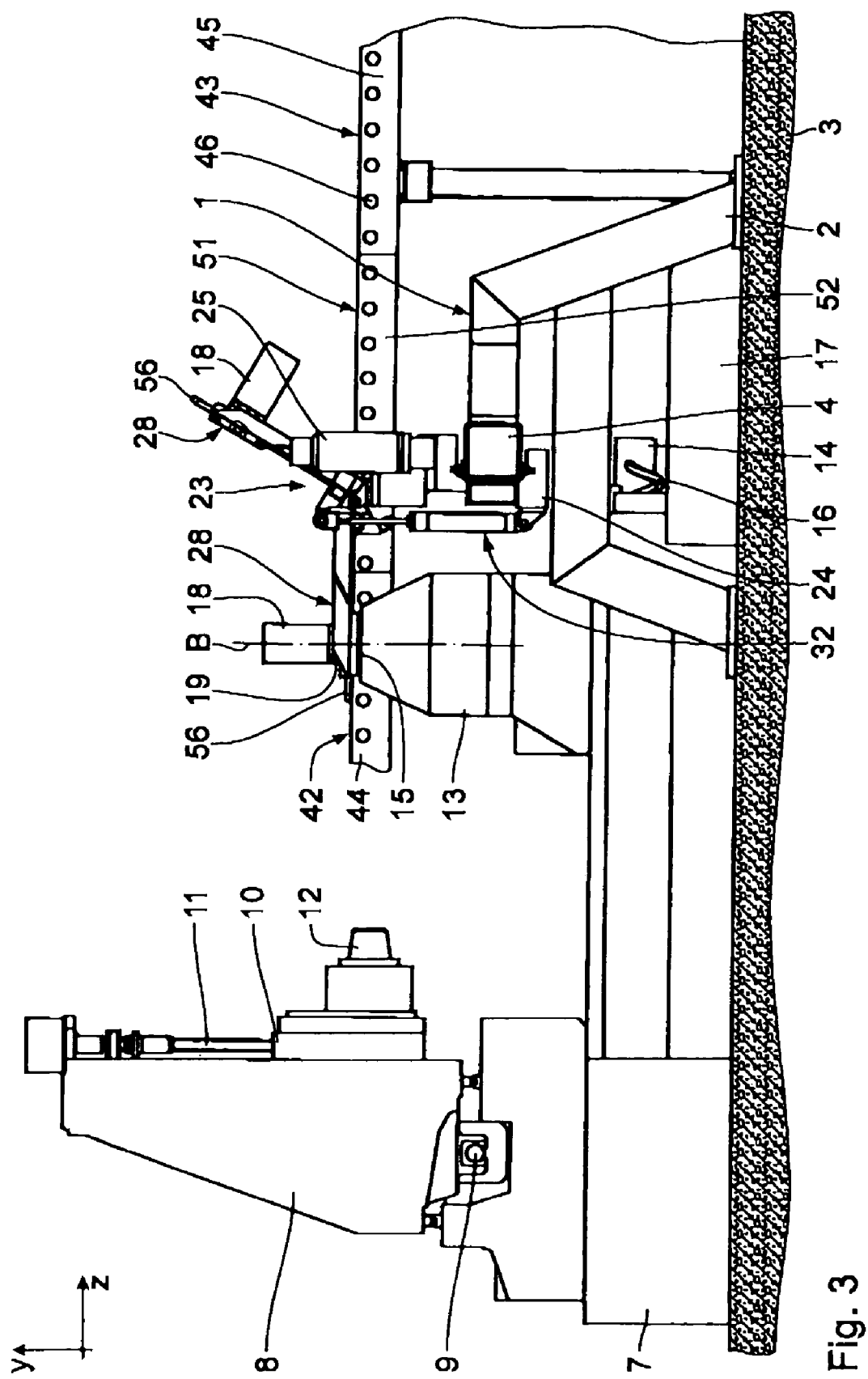
FIG. 3 shows a side view of a processing machine with loading means.
Figure 4:
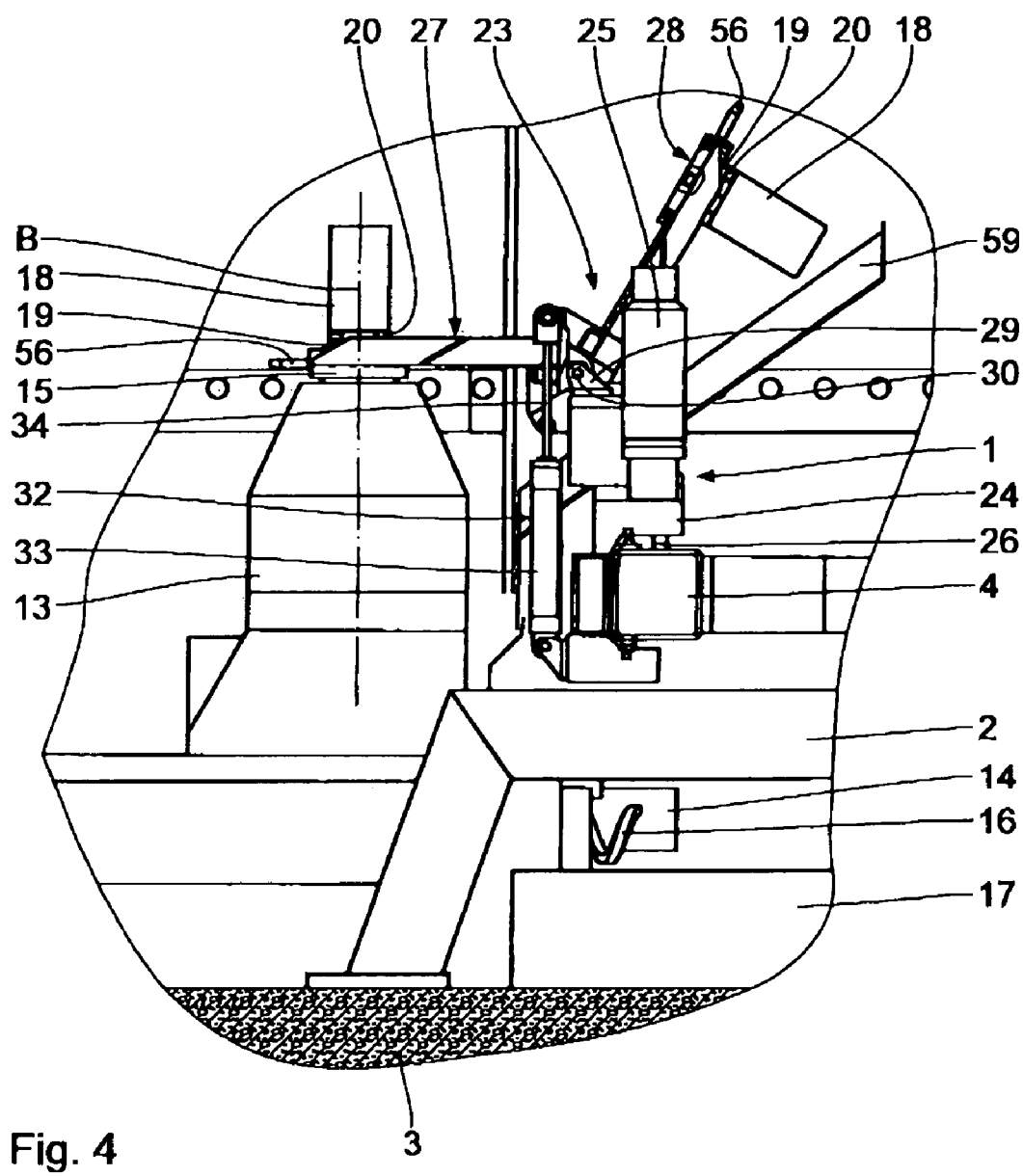
FIG. 4 shows an enlarged detail view of FIG. 3.
Figure 5:
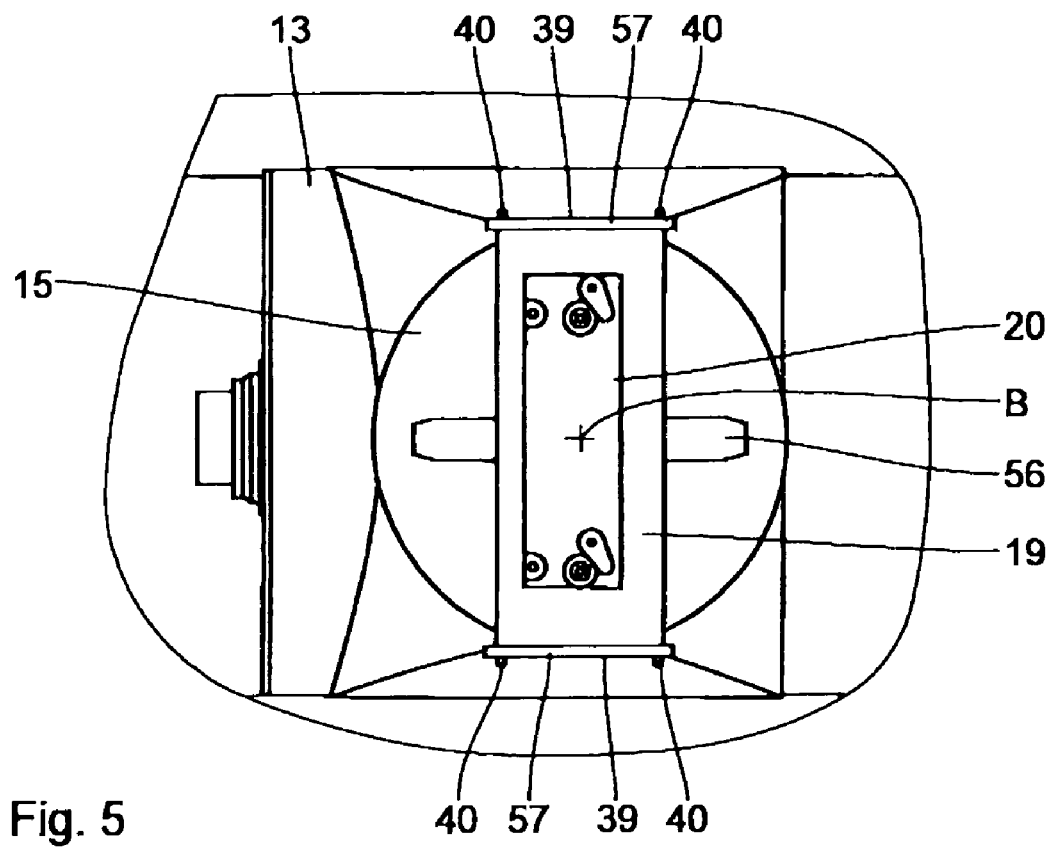
FIG. 5 shows an enlarged detail view of FIG. 1, with a workpiece carriage having an adapter plate but without a workpiece.
Figure 6:
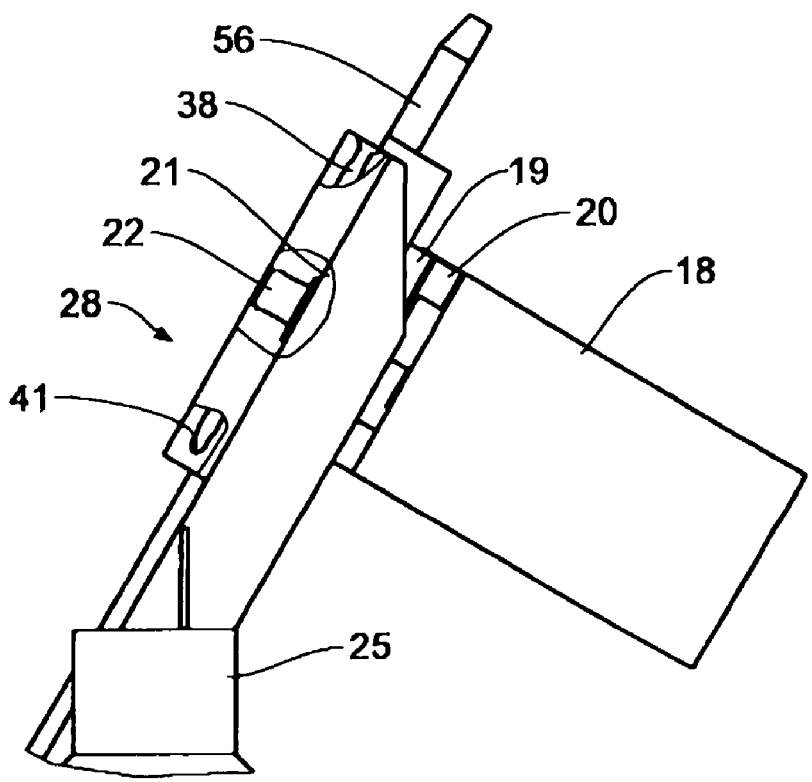
FIG. 6 shows a side detail view of a workpiece gripper with a workpiece, partially broken open.
Figure 7:
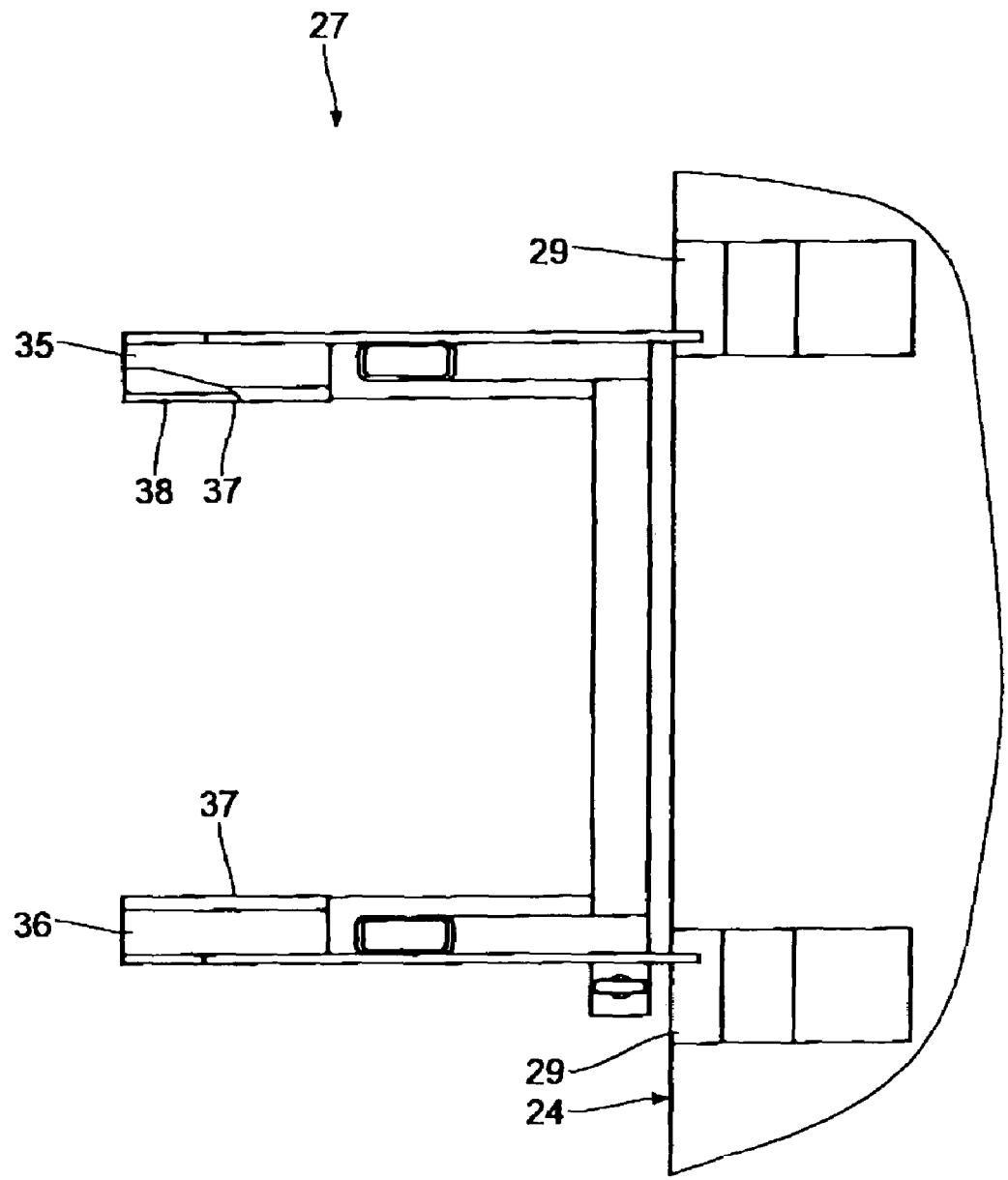
FIG. 7 shows a top view of a workpiece gripper, partially broken open.

An inclined dripping bowl 59 is disposed below the respective workpiece gripper 27, 28 on the travelling carriage 24 (FIGS. 1, 2 and 4) through which cooling liquid or shavings falling from the processed workpieces 18 can be discharged in a defined manner.

The installation functions as follows:

A workpiece 18, clamped on a workpiece carrier 19, is supplied to the loading transport means 1 in the transport direction 48 via the supply transport means 42. The loading means 23 is disposed in front of the supply transport means 42 and the workpiece gripper 28 is directly in front of the transport rollers 46 of the supply transport means 42 in the pivoted-down horizontal position. In this position, the workpiece gripper 27 is in front of the storage transport means 49.

The adapter plate 19, with the workpiece 18 which is to be processed, are transported in the transport direction 48 and the adapter plate 19 is inserted into the fork-shaped workpiece gripper 28, as described above. The workpiece gripper 28, loaded in this manner, is then pivoted into its elevated position. If the respective positioning pin 40 does not exactly abut the stop 41 of the groove 38, exact abutment occurs when the workpiece gripper 28 is pivoted up. This final positioning may be a displacement of only one or a few millimeters. These simple means provide for exact positioning of the adapter plate 19 in the workpiece gripper 28 and thereby also for exact positioning relative to a workpiece carriage 13.

The loading means 23 is subsequently moved in front of a processing machine 5. The workpiece carriage 13 is moved into its position neighboring the loading transport means 1 or is already in this position (see FIG. 1 in connection with the processing machine 5). The workpiece gripper 28 is then pivoted down into the horizontal position in which the adapter plate 19 reaches the workpiece table 15. The adapter plate 19 is then clamped as mentioned above using the zero point clamping means 21. The workpiece carriage 13, including adapter plate 19 and workpiece 18, are then displaced towards the tool spindle 12 of the processing machine 5, i.e. into a position shown in FIG. 1 in connection with the processing machine 6. During this motion, the adapter plate 19 is extracted from the workpiece gripper 28.

At this processing machine 5 or another processing machine 6, the loading means 23 can accept a processed workpiece 18 using the workpiece gripper 27 on the side of the transport means 42, 43. This is achieved by positioning the loading means 23 in front of the corresponding processing machine 5, 6, and downwardly pivoting the workpiece gripper 27 into its horizontal position towards the processing machine 6. The workpiece carriage 13 of this processing machine 5 or 6 then moves below the workpiece gripper 27. The adapter plate 19 on the workpiece carriage 31 including the processed workpiece 18 is thereby moved into the workpiece gripper 27. The locking by the zero point clamping means 21 is released such that the workpiece gripper 27 and adapter plate 19 and workpiece 18 can be pivoted in an upward direction.

The processed workpiece 18 is subsequently either moved to a further processing machine for further processing or supplied to the discharge transport means 43. Towards this end, the loading means 23, including workpiece 18, moves in front of the storage transport means 47, where the workpiece gripper 27 with adapter plate 19 and workpiece 18 are pivoted down. The adapter plate 19 is removed from the workpiece gripper 27 by driving the transport rollers 46 of the storage transport means 49 opposite to the transport direction 48. At the same time, a workpiece 18 to be processed and supplied on the supply transport means 42 can be received as described above using the workpiece gripper 28. The loading means 23 is again moved to one of the processing machines 5, 6 to load the workpiece 18 to be processed into the corresponding machine 5, 6 as described above. In the meantime, the transfer transport means 51 is moved in front of the storage transport means 49. By driving the transport rollers 46 of the storage transport means 49 and transfer transport means 51, the adapter plate 19, which is intermediately disposed or stored on the storage transport means 49 along with the processed workpiece 18, is pushed onto the transfer transport means 51. Said transfer transport means 51 is then moved, with adapter plate 19, in front of the discharge transport means 43 with the transport rollers 46 not being driven. The transport rollers 46 of the transfer transport means 51 are then driven to push the adapter plate 19, including the processed workpiece 18, onto the discharge transport means 43 to be moved away in the transport direction 48 using the continuously driven transport rollers 46. As can be gathered from the above, the two workpiece grippers 27, 28 are pivoted-up during motion of the loading means 23.

In principle, only one workpiece gripper 27 or 28 may be disposed on the loading means 23. However, two workpiece grippers 27, 28 considerably increase the performance.

During normal operation, a processed workpiece 18 is removed from a processing machine using the workpiece gripper 27, and the travelling carriage 24 is subsequently moved until the neighboring workpiece gripper 28, with adapter plate 19 and workpiece 18, is positioned in front of the processing machine 5 or 6 to transfer a workpiece 18 to be processed. The downtimes of a processing machine 5 or 6 are thereby minimized.

The transfer transport means 51 must not necessarily have its own conveying motor 53. It may be rigidly connected to the travelling carriage 24 of the loading means 23 via a bar, thereby also generating the conveying motion of the transfer transport means 51.

The discharge transport means 43 must not necessarily be aligned with the supply transport means 42, but if it is, positioning of the transfer transport means 51 in the gap 54 between the supply transport means 42 and the discharge transport means 43 permits passage of a workpiece 18 therethrough, without transfer to one of the processing machines 5 or 6.

What is claimed is:
1. A production installation comprising:
   a plurality of processing machines which are disposed next to each other in a row;
   a loading transport means comprising:
      a transport rail connecting the processing machines, the transport rail having a longitudinal axis;
      at least one loading means which is movable on the transport rail; and
      at least one workpiece gripper disposed on the loading means for supplying the processing machines with workpieces to be processed and for removing processed workpieces from the processing machines;
   a supply transport means for supplying workpieces to be processed to the loading transport means in a transport direction, transverse to the direction of the transport rail; and
   a discharge transport means for unloading processed workpieces from the loading transport means in a transport direction transverse to the direction of the transport rail,
   wherein the at least one workpiece gripper is pivotable about only one pivot axis that is parallel to the longitudinal axis of the transport rail between a lowered transfer position and a raised transport position;
   wherein the supply transport means and the discharge transport means are adjacent to the transport rail and are spaced from one another by a gap therebetween that is spanned by the transport rail;
   a storage transport means disposed next to one of the supply transport means or the discharge transport means; and a transfer transport means which is movable on the transport rail between a transfer position in front of the discharge transport means, a storage position in front of the storage transport means, and a rest position independent therefrom.

2. Production installation according to claim 1, wherein the at least one workpiece gripper is fork-shaped.

3. Production installation according to claim 2,
wherein workpiece carriers are provided for the workpieces, which workpiece carriers comprise lateral retaining elements; and
wherein the at least one fork-shaped workpiece gripper comprises two arms having grooves for receiving the retaining elements.

4. Production installation according to claim 3,
wherein the workpiece carriage is designed for pulling out a workpiece carrier from a fork-shaped workpiece gripper and for pushing a workpiece carrier into a fork-shaped workpiece gripper.

5. Production installation according to claim 1, wherein the processing machines comprise a workpiece carriage which is movable transversely with respect to the longitudinal axis of the transport rail.

6. Production installation according to claim 1, wherein two workpiece grippers are disposed on the loading means.

7. Production installation according to claim 6,
wherein the distance between the two workpiece grippers on the loading means measured along the longitudinal axis of the transport rail corresponds to the distance between the supply transport means and the storage transport means.

8. Production installation according to claim 1, wherein the processing machines are disposed on a first side of the transport rail in a single row, and the storage transport means is disposed on said first side of the transport rail next to the supply transport means.

9. Production installation according to claim 1,
wherein the transfer transport means, when positioned in the transfer position in front of the discharge transport means, connects said discharge transport means to the supply transport means.

10. Production installation according to claim 1,
wherein the supply transport means, the discharge transport means, the storage transport means and the transfer transport means are formed as roller transport means having drivable transport rollers.

11. Production installation according to claim 1,
wherein the transfer transport means is disposed for displacement along the longitudinal axis of the transport rail.

12. Production installation comprising:
a plurality of processing machines which are disposed next to each other in a row;
a loading transport device which comprises:
   a transport rail connecting the processing machines, the transport rail having a longitudinal axis;
   at least one loading device which is movable along the longitudinal axis of the transport rail; and
   at least one workpiece gripper disposed on the loading device for supplying the processing machines with workpieces to be processed and for removing processed workpieces from the processing machines;
a supply transport device for supplying workpieces to be processed to the loading transport device in a transport direction, transverse to the direction of the transport rail; and
a discharge transport device for unloading processed workpieces from the loading transport device in a transport direction transverse to the direction of the transport rail;
wherein the at least one workpiece gripper is pivotable about only one pivot axis that is parallel to the longitudinal axis of the transport rail between a lowered transfer position and a raised transport position;
wherein the supply transport device and the discharge transport device are adjacent to the transport rail and are spaced from one another by a gap therebetween that is spanned by the transport rail;
a storage transport device disposed next to one of the supply transport device or the discharge transport device; and
a transfer transport device which is movable along the longitudinal axis of the transport rail between a transfer position in front of the discharge transport device, a storage position in front of the storage transport device, and a rest position independent therefrom.

13. Production installation according to claim 12 further comprising:
workpiece carriers for each of the workpieces, said workpiece carriers having lateral retaining elements; and
wherein the at least one workpiece gripper comprises two arms having grooves for receiving the lateral retaining elements.

14. Production installation according to claim 13,
wherein the workpiece carriage is designed for pulling out a workpiece carrier from a fork-shaped workpiece gripper and for pushing a workpiece carrier into a fork-shaped workpiece gripper.

15. Production installation according to claim 12,
wherein the processing machines comprise a workpiece carriage which is movable transversely with respect to the longitudinal axis of the transport rail.

16. Production installation according to claim 12,
wherein the processing machines are disposed on a first side of the transport rail in only one row, and the storage transport device is disposed on said first side next to the supply transport device.

17. Production installation according to claim 12,
wherein the transfer transport device, when positioned in its transfer position in front of the discharge transport device, connects said discharge transport device to the supply transport device.

18. Production installation according to claim 12,
wherein the supply transport device, the discharge transport device, the storage transport device and the transfer transport device are formed as roller transport devices having drivable transport rollers.

19. Production installation according to claim 12,
wherein the transfer transport device is disposed for displacement along the longitudinal axis of the transport rail.

20. Production installation according to claim 12 further comprising:
two workpiece grippers disposed on the loading device, wherein the two workpiece grippers are separated by a distance measured along the longitudinal axis of the transport rail that is equal to the distance between the supply transport device and the storage transport device.

* * * * *